United States Patent
Giovanardi et al.

(10) Patent No.: US 12,477,022 B2
(45) Date of Patent: Nov. 18, 2025

(54) AUTOMATIC TASK GENERATION

(71) Applicant: Zoom Video Communications, Inc., San Jose, CA (US)

(72) Inventors: Davide Giovanardi, San Jose, CA (US); Daniar Imanbayev, Seattle, WA (US); Bilung Lee, San Jose, CA (US); Vijay Venkataswamy Parthasarathy, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/381,850

(22) Filed: Oct. 19, 2023

(65) Prior Publication Data

US 2025/0097275 A1    Mar. 20, 2025

Related U.S. Application Data

(60) Provisional application No. 63/538,593, filed on Sep. 15, 2023.

(51) Int. Cl.
*H04L 65/402* (2022.01)
*G06F 3/0482* (2013.01)
*G06F 3/0484* (2022.01)

(52) U.S. Cl.
CPC ........ H04L 65/4025 (2022.05); G06F 3/0482 (2013.01); G06F 3/0484 (2013.01)

(58) Field of Classification Search
CPC ... H04L 65/4025; G06F 3/0482; G06F 3/0484
See application file for complete search history.

(56) References Cited

U.S. PATENT DOCUMENTS

| | | | |
|---|---|---|---|
| 7,496,500 B2 * | 2/2009 | Reed | G06Q 10/107 709/240 |
| 10,586,539 B2 * | 3/2020 | Raanani | H04M 3/22 |
| 10,679,013 B2 * | 6/2020 | Raanani | G10L 15/22 |
| 11,893,427 B2 * | 2/2024 | Subedi | G06Q 10/107 |
| 2013/0124648 A1 * | 5/2013 | Kallayil | G06Q 10/107 709/206 |
| 2017/0126610 A1 * | 5/2017 | Sachidanandam | H04L 51/226 |
| 2018/0349793 A1 * | 12/2018 | Triolo | G06N 5/048 |
| 2019/0236486 A1 * | 8/2019 | Azab | G06N 20/00 |
| 2020/0005248 A1 * | 1/2020 | Gerzi | G06Q 10/1097 |
| 2020/0259768 A1 * | 8/2020 | Mizoguchi | H04L 51/02 |
| 2021/0099317 A1 | 4/2021 | Hilleli et al. | |

(Continued)

OTHER PUBLICATIONS

International Search Report & Written Opinion for PCT/US2024/042438 mailed Nov. 18, 2024.

*Primary Examiner* — Oanh Duong
(74) *Attorney, Agent, or Firm* — Kilpatrick Townsend & Stockton, LLP

(57) ABSTRACT

Example methods and systems for automatic task generation is provided. A communication platform receives an instruction to generate one or more task items associated with a virtual communication session related to a user. The communication platform accesses virtual communication data associated with the virtual communication session. The communication platform generates a task item based on the virtual communication data using a generative artificial intelligence (AI) model. The communication platform provides the task item to the user.

17 Claims, 8 Drawing Sheets

(56) References Cited

U.S. PATENT DOCUMENTS

| | | | |
|---|---|---|---|
| 2021/0271823 A1* | 9/2021 | De Ridder | G06N 5/022 |
| 2021/0326742 A1 | 10/2021 | Rosset et al. | |
| 2022/0164713 A1* | 5/2022 | Dori-Hacohen | G06N 3/045 |
| 2022/0263877 A1 | 8/2022 | Conlin et al. | |
| 2022/0334691 A1* | 10/2022 | Robb | G06Q 10/109 |
| 2023/0063603 A1* | 3/2023 | Matsuoka | H04L 51/04 |
| 2023/0252325 A1* | 8/2023 | Gupta | G06N 7/01 |
| | | | 706/12 |
| 2023/0290348 A1* | 9/2023 | Rodriguez | G06F 3/167 |
| 2023/0306574 A1* | 9/2023 | Bobert | G06Q 10/0635 |
| 2023/0308409 A1* | 9/2023 | Rosenstein | H04L 51/04 |
| 2023/0326451 A1* | 10/2023 | Sundararajan | G10L 15/22 |
| | | | 704/270 |
| 2023/0379273 A1* | 11/2023 | Yannam | H04L 51/58 |
| 2023/0394173 A1* | 12/2023 | Viswanathan | G06F 21/6227 |
| 2024/0015076 A1* | 1/2024 | Donthireddy | H04W 24/08 |
| 2024/0040346 A1* | 2/2024 | Beaver | G06Q 30/016 |
| 2024/0056326 A1* | 2/2024 | Samudrala | H04L 12/1822 |
| 2024/0160902 A1* | 5/2024 | Padgett | G06N 3/0895 |
| 2024/0402692 A1* | 12/2024 | Sheppard-Guzelaydin | |
| | | | G05B 19/41875 |
| 2024/0412433 A1* | 12/2024 | Smetanin | G06T 13/80 |
| 2025/0021842 A1* | 1/2025 | Bernstein | G06N 5/02 |
| 2025/0028579 A1* | 1/2025 | Mehmeri | G06N 3/006 |

\* cited by examiner

AUTOMATIC TASK GENERATION

CROSS-REFERENCE TO RELATED APPLICATIONS

This application claims priority from U.S. Provisional Patent Application No. 63/538,593, filed Sep. 15, 2023, titled "Automatic Task Generation," the entirety of which is hereby incorporated by reference.

FIELD

The present application generally relates to virtual communication and more specifically relates to automatic task generation.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
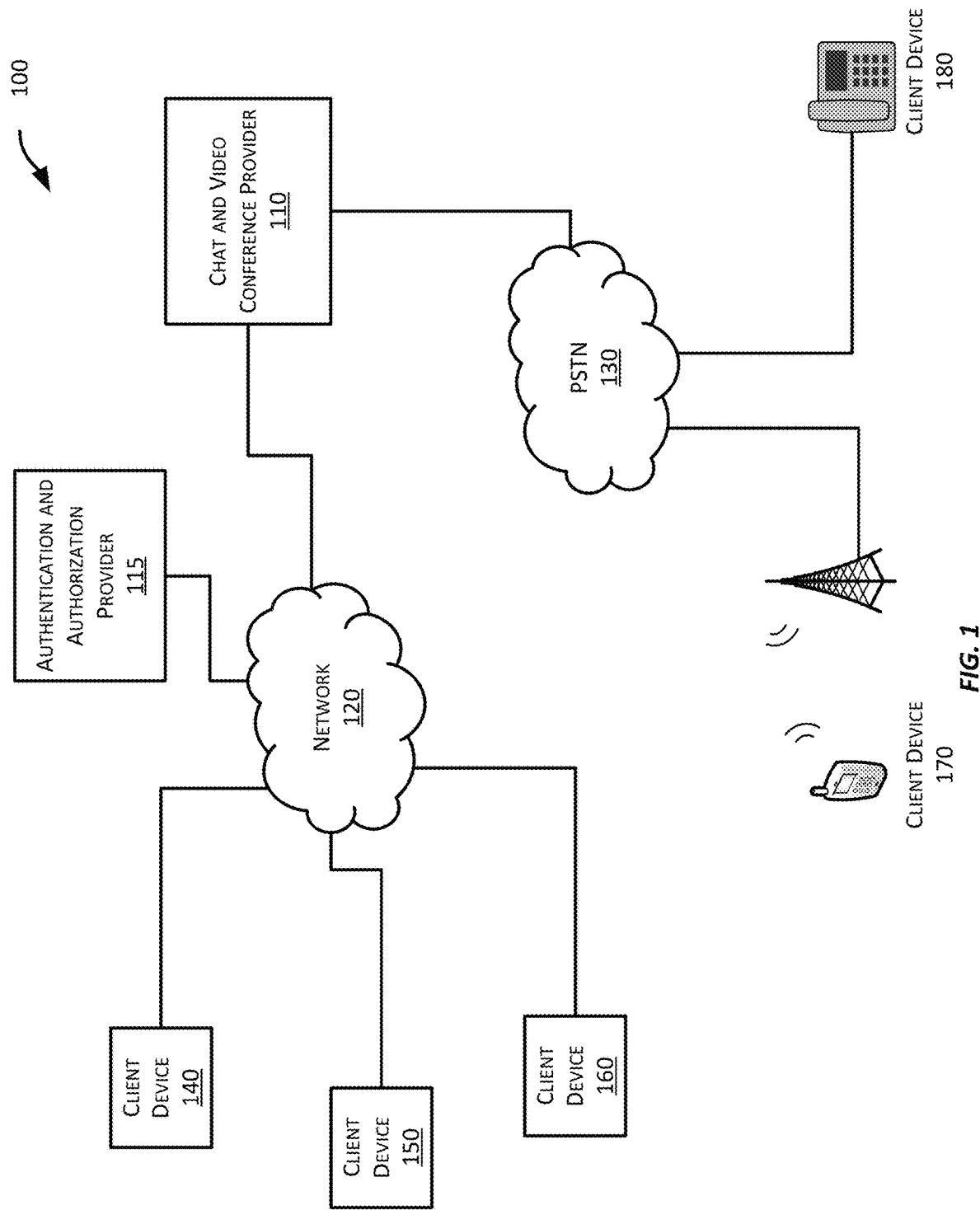
FIG. 1 shows an example system that provides videoconferencing and chat functionality to various client devices.

Examples are described herein in the context of automatic task generation. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Virtual communications, such as virtual phone calls, video conferences, online chats, emails, or any other online interactions, become important ways for users to discuss various aspects related to a project, a deal, or any suitable subjects. Some users may need to take certain actions based on certain virtual communications or after the virtual communications. It may take a long time for a user to review all the unread virtual communications (e.g., voicemail messages, emails, or chat messages) and sift through action items. Further, it can be difficult for a user to track all the tasks from different communication channels.

To facilitate users to keep track of and take action following virtual communications, it is desirable for a communication platform to automatically generate and organize task items from the virtual communications. For example, the communication platform provides a task generation engine for automatically generating and aggregating interactive task items from various types of virtual communications.

The task generation engine on the communication platform can implement a pre-trained generative artificial intelligence (AI) model to generate task items based on virtual communication data. A user on the communication platform or an operation of the communication platform can set up instructions for the pre-trained generative AI model to generate task items. The instructions can include, but not limited to, types of virtual communication data that can be processed for task generation, a structure of task items, a length of a task item (e.g., total number of characters or words). The types of virtual communication data that can be processed for task generation, whether automatically or at the user's request, can include voicemail messages, text messages, chat messages, emails, recordings for video conferences, etc. An example structure of task items can be <suggested action> <speaker/sender> from <speaker/sender profile> at <contact information> and <other content>. The other content that can be included in a task item can include a sentiment note about the speak (e.g., happy, angry, etc.), a summary of the virtual communication, or any other suitable notes to the task owner. The instructions can be pre-programmed into the pre-trained generative AI model. A user may update the instructions to personalize.

In an example, a communication platform provides a virtual phone call functionality. A first user calls a second user over the communication platform and leaves a voicemail message. The communication platform can generate a transcript for the voicemail message and extract relevant metadata about the voicemail message, for example the first user's phone number. The task generation engine can access the transcript or recording of the voicemail message. Alternatively, the communication platform can provide the transcript or recording to the task generation engine.

The task generation engine can generate a task item from the transcript or the recording of the voicemail message based on the pre-programmed instructions, using the pre-trained generative AI model. If there is no task item, the task generation engine can return a "no task" message. The task item can include speaker information (e.g., name, title, etc.), the speaker's phone number to call back or other contact information to reach back to the speaker, and a summary of the voicemail message (e.g., a request from the speaker). In some examples, the task generation engine can aggregate task items generated from different communication channels into a list and provide the list of task items to the user.

In some examples, the communication platform also includes a content moderation engine configured to analyze the virtual communication data or the generated task items for any inappropriate content (e.g., hate, harassment, sexual, violent, etc.) and flag it to the user associated with the virtual communication data or the task owner. The content moderation engine can implement an AI or machine learning (ML) model for analyzing the content. A user on the communication platform may enable or disable the content moderation functionality via a communication application provided by the communication platform. If the content moderation is enabled, the content of the recording or the transcript of the voicemail message can be analyzed for content moderation before being processed for task generation. Alternatively, the generated task item from the recording or transcript of the voicemail message can be processed for content moderation before being displayed to the task owner. In some examples, a note about inappropriate language being used (but not the inappropriate language itself) may be included in the task item for the task owner's information.

The communication platform can provide the generated task item to the second user who received the voicemail message via a GUI of the communication application. The task item can be displayed in a GUI element next to the voicemail message. Certain content in the task item in the GUI element can be hyperlinked. For example, the task item includes a phone number to call. The phone number can be hyperlinked so that the second user can click the number to dial directly. If the task item includes an email address, the email address can be hyperlinked. If a user clicks the email address, an email window can be opened for the user to draft an email and send to the email address. The GUI of the communication application can display a list of task items generated from different communication channels to the user. The task items can be edited. Reminders can be sent to the user via a pop-up message or other suitable means.

Thus, this example automatically generates a task item for a user based on virtual communication data. The user does not need to review the virtual communication data, for example replaying voicemail messages, reading emails or chat messages. Meanwhile, a list of task items can be aggregated from virtual communications in different channels so that the user can track the task items at one place, without clicking through different communication channels.

Applicant's goal is to invest in AI-driven innovation that enhances user experience and productivity while prioritizing trust, safety, and privacy. Applicant does not use any customer audio, video, chat, screen-sharing, attachments, or other communications-like customer content (such as poll results, whiteboards, or reactions) to train Applicant's or third-party artificial intelligence models. Additionally, AI-enabled features are turned off by default-account owners and administrators control whether to enable these AI features for their accounts. Applicant provides admins and users control and visibility when AI features are being used or activated. By putting its customers' privacy needs first, Applicant is taking a leadership position, enabling its customers to use AI-powered tools and its capabilities with confidence.

This illustrative example is given to introduce the reader to the general subject matter discussed herein and the disclosure is not limited to this example. The following sections describe various additional non-limiting examples and examples of automatic task generation.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
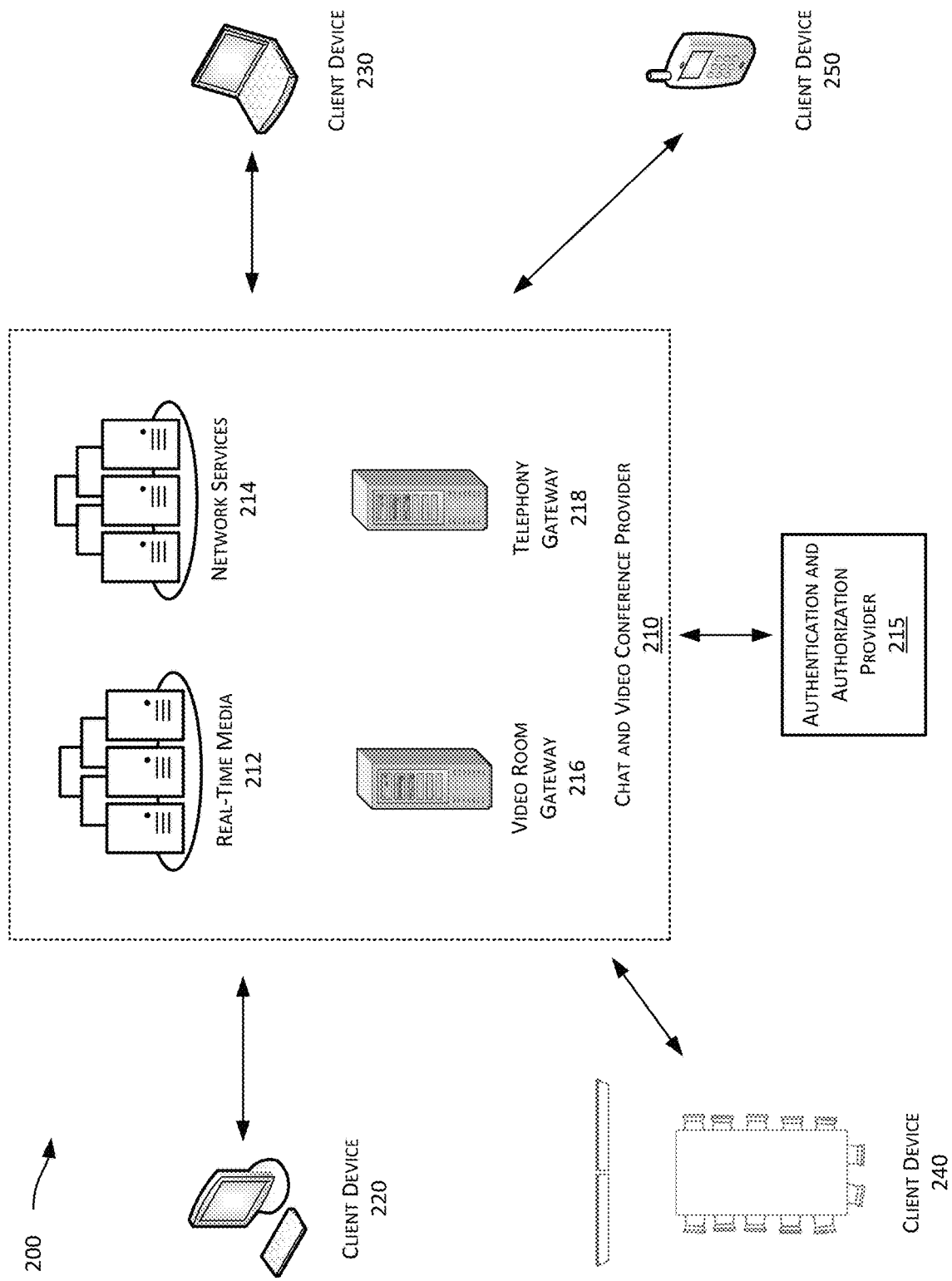
FIG. 2 shows an example system in which a chat and video conference provider provides videoconferencing and chat functionality to various client device.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting.

Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
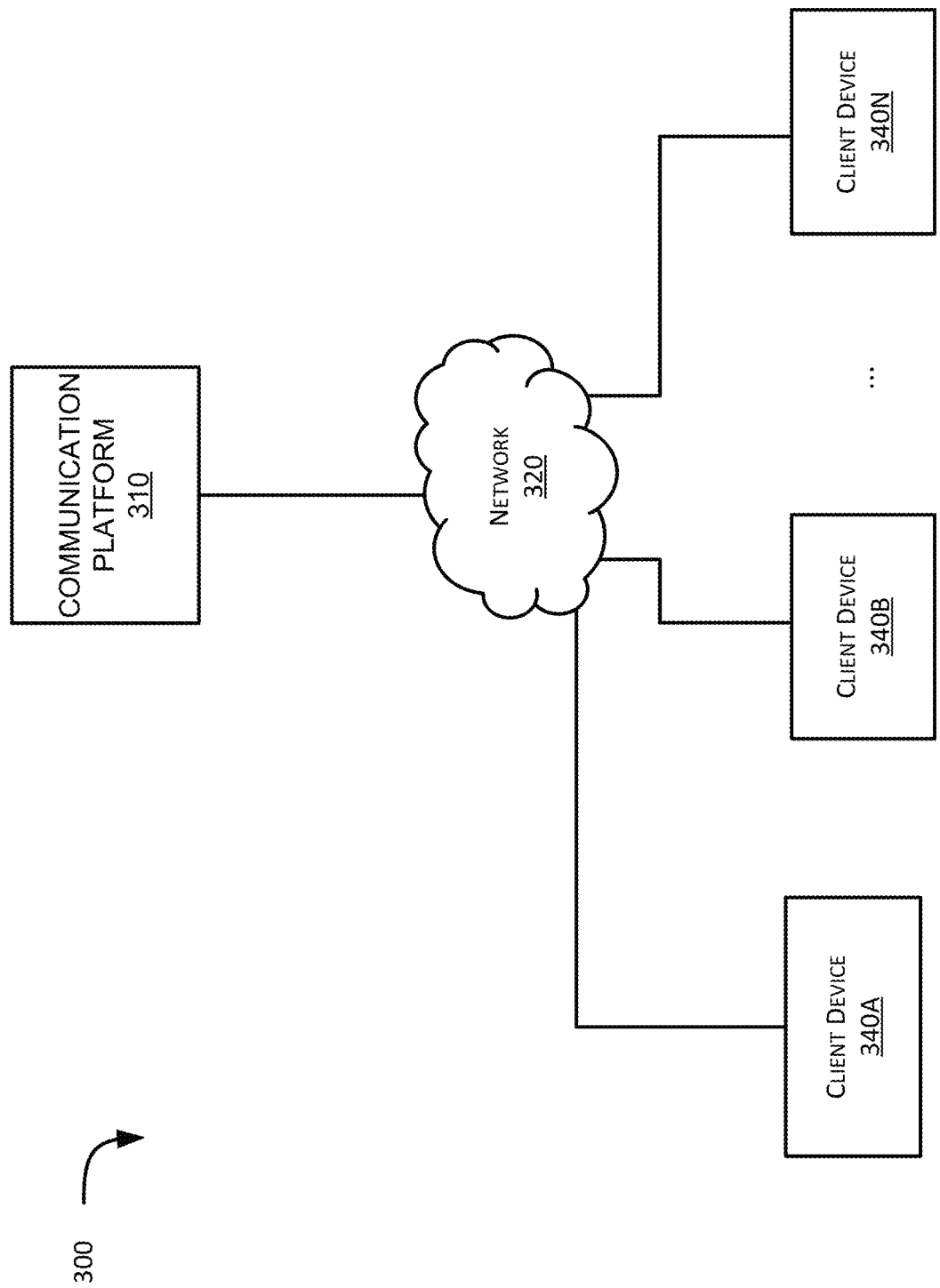
FIG. 3 shows an example system that can establish a virtual communication session.

Referring now to FIG. 3, FIG. 3 shows an example system 300 that can establish a virtual communication session. In this example system 300, a communication platform 310 and a number of client device 340A-340N (which may be referred to herein individually as a client device 340 or collectively as the client devices 340) are connected via a network 320. The communication platform 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANS, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the communication platform 310 using the internet or other suitable computer network. The client devices 340 have communication software installed to enable them to connect to the communication platform 310 for chats, video conferences, emails, and any other suitable communications. For example, during a chat session, a user associated a client device (e.g., client device 340A) can interact with other users associated with other client devices (e.g., client device 340B-340N) via the communication platform 310 by sending and receiving chat messages, and reacting to received chat messages.

Figure 4:
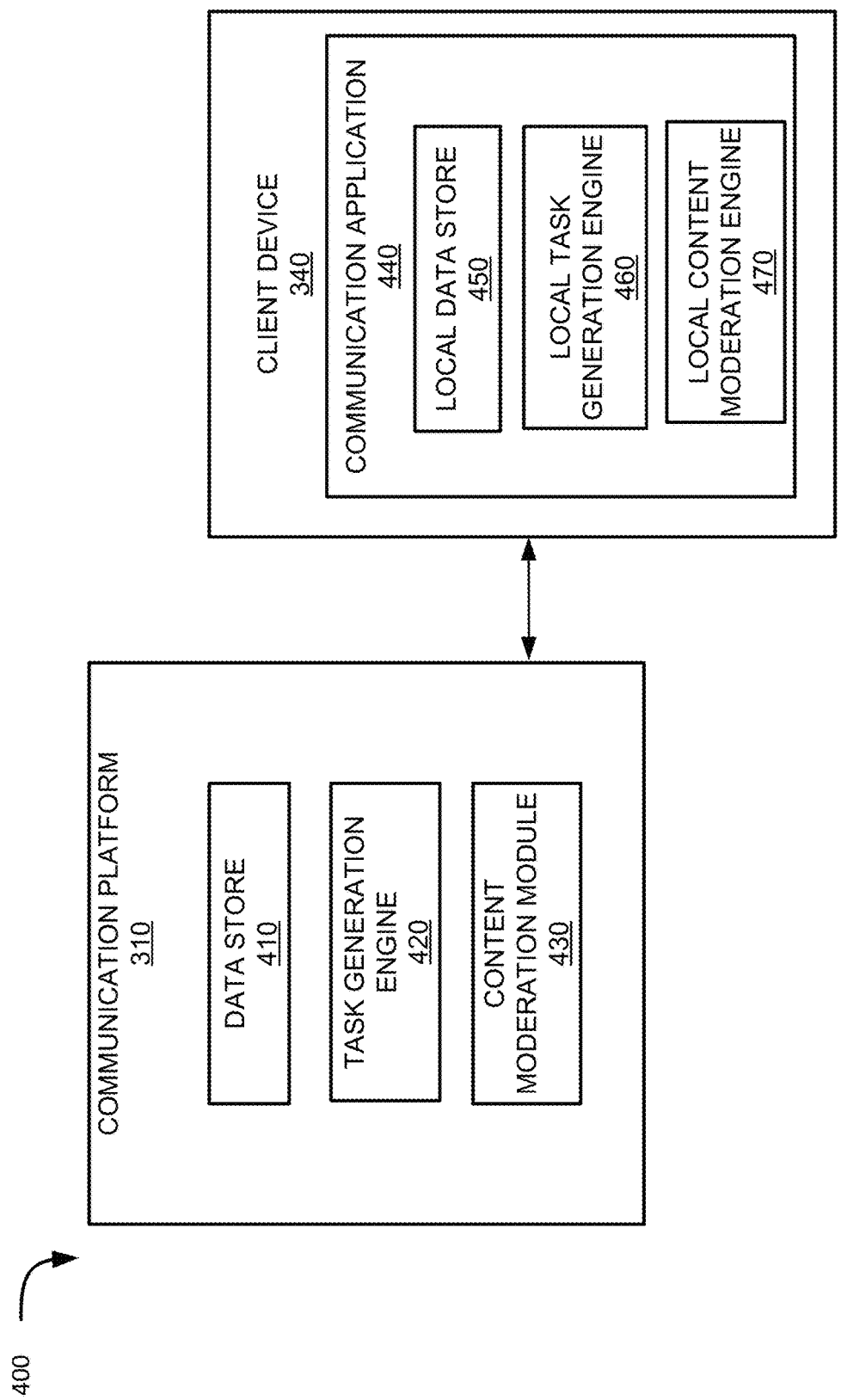
FIG. 4 shows an example system that is configured to automatically generate task items from virtual communication data.

Now referring to FIG. 4, FIG. 4 shows an example system 400 that is configured to automatically generate task items from virtual communications. The communication platform 310 is in network communication with a client device 340. The client device 340 is installed with a communication application 440 provided by the communication platform 310.

The communication platform 310 includes a data store 410, a task generation engine 420, and a content moderation engine 430. The data store 410 stores virtual communication data and metadata associated with different virtual communication sessions established on the communication platform 310. The virtual communication sessions can be video conference sessions, chat sessions, email threads, phone calls, etc. The virtual communication data associated with a video conference session can include one or more of a recording of the video conference session, a transcript of the recording, and shared documents during the video conference session. The metadata associated with the video conference session can include one or more of a title of the video conference session, a start and end time of the video conference session, a description of the video conference session, an agenda of the video conference session, and participant data associated with the video conference session. The virtual communication data associated with a chat session can include chat messages. The chat messages can be text-based messages, hyperlinks, or documents. The metadata associated with the chat session can include one or more of a topic of the chat session, a start and end time of the chat session, the participant data associated with the chat session. The virtual communication data associated with an email thread can include the email content in the email thread. The metadata associated with the email thread can include one or more of a subject of the email thread, a send time of an email in the email thread, and sender and recipient data associated with an email in the email thread. The virtual communication data associated with a phone call can include a voicemail message or a recording of the phone call. The metadata associated with the phone call can include one or more of a calling phone number and associated name if there is any available, a calling time, and a duration of the phone call.

The task generation engine 420 is configured to generate a task item from virtual communication data. The task generation engine 420 can implement a pre-trained generative AI model (e.g., large language model (LLM)) to generate task items based on virtual communication data. A user on the communication platform or an operation of the communication platform can set up instructions for the pre-trained generative AI model to generate task items. The instructions can include, but not limited to, types of virtual communication sessions or virtual communication data that can be processed for task generation, a structure of task items, a length of a task item (e.g., total number of characters or words). The types of virtual communication sessions can include virtual conferences, phone calls, online chat session, email threads. The types of virtual communication data that can be processed for task generation can include voicemail messages, text messages, chat messages, emails, recordings or transcripts for virtual conferences, etc. An example structure of task items can be <suggested action> <speaker/sender> from <speaker/sender profile> at <contact information> and <other content>. The other content that can be included in a task item can include a sentiment note about the speaker (e.g., happy, angry, etc.), a summary of the virtual communication, or any other suitable notes to the task owner. The instructions can be pre-programmed into the pre-trained generative AI model. The user can update the instructions via a GUI. The instructions can be considered as a prompt to the pre-trained generative AI model. The task generation engine can generate a task item from the transcript or the recording of the voicemail message based on the pre-programmed instructions. If there is no task item, the task generation engine can return a "no task" message. The task generation engine can also aggregate task items generated from different communication channels into a list.

The content moderation engine 430 is configured to analyze the virtual communication data or the generated task items for any inappropriate content (e.g., hate, harassment, sexual, violent, etc.) and flag it to the user associated with the virtual communication data or the task owner. The content moderation engine 430 can implement an AI/ML model for analyzing the content. A user on the communication platform 310 may enable or disable the content moderation functionality via a communication application 440 provided by the communication platform 310. If the content moderation is enabled, the content of recording or the transcript of the voicemail message can be analyzed to filter out in appropriate language before being processed for task generation. Alternatively, the generated task item from the recording or transcript of the voicemail message can be processed to filter out inappropriate language before being displayed to the task owner. In some examples, a note about inappropriate language being used in the virtual communication (but not the inappropriate language itself) may be included in the task item for the task owner's information. The content moderation engine 430 can be optional.

In some examples of the present disclosure, implementations may include or otherwise use one or more AI or ML (collectively, AI/ML) systems having one or more models trained for one or more purposes. Use of such AI/ML systems, such as for generating summaries or evaluation reports of virtual communication sessions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features.

To enhance privacy and safety, as well as provide other benefits, the AI/ML processing system may be prevented from using personal information (e.g., customer audio, video, chat, screen-sharing, attachments, or other communications-like customer content (such as poll results, whiteboards, or reactions)) to train any AI/ML models and instead only use the personal information for inferencing of the AI/ML processing system. Instead of using personal information to train AI/ML models, AI/ML model training may be performed using one or more commercially licensed data sets that do not contain the personal information of the user or organization. AI/ML model training for task item generation and content moderation and others in the present disclosure can be done without using user data (e.g., virtual communication data) on the communication platform 310.

The communication platform 310 can provide the generated task item to the user via a GUI of the communication application 440 provided by communication platform 310. The task item can be displayed in a GUI element next to a virtual communication record (e.g., voicemail, recording of a virtual conference, etc.). Certain content in the task item in the GUI element can be hyperlinked. For example, the task item includes a phone number to call. The phone number can be hyperlinked so that the second user can click the number to dial directly. If the task item includes an email address, the email address can be hyperlinked. The GUI of the communication application can also display a list of task items generated and aggregated from different communication channels.

The communication application 440 installed on the client device 340 can include a local data store 450, a local task generation engine 460, and a local content moderation engine 470. The local data store 450 can store virtual communication data associated with virtual communication sessions directed to, hosted or joined by the local user associated with the client device 340. The local task generation engine 460 can be configured to generate a task item based on virtual communication data stored in the local data store 475 or other accessible data, similar to the task generation engine 420 as described above. The local task generation engine 460 can implement a generative AI model provided by the communication platform 310. The local content moderation engine 470 can be configured to analyze the content of the virtual communication data stored in the local data store 450 or accessible by the communication application 440, or analyze the task items generated by the local task generation engine 460 to filter out inappropriate language or generate notes about the inappropriate language usage. The communication application 440 can also include a GUI for virtual communications and a GUI for a list of task items. A generated task item can be displayed in a GUI element for the user to interact with.

Figure 5:
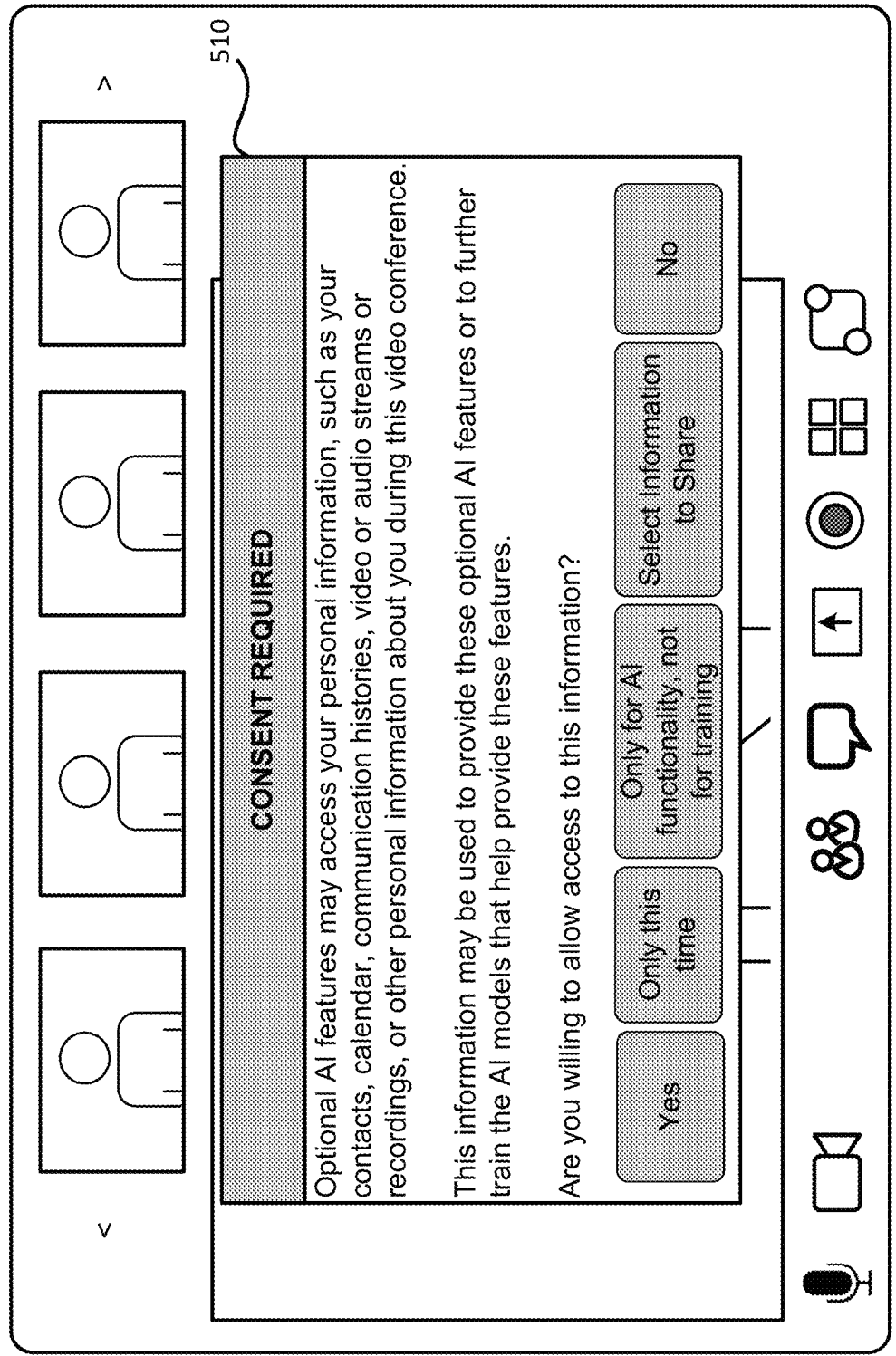
FIG. 5 shows an example GUI displaying a consent authorization request for accessing personal data.

Referring now to FIG. 5, FIG. 5 shows an example GUI 500 displaying a consent authorization request for accessing personal data. In some examples according to the present disclosure, a user may select an option to use one or more optional AI features available from a communication platform, such as the chat and virtual conference provider 110 or the chat and video conference provider 210. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Applicant's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 5, a user has engaged in a video conference and has selected an option to use an available optional AI feature. In response, the GUI has displayed a consent authorization window 510 for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 6:
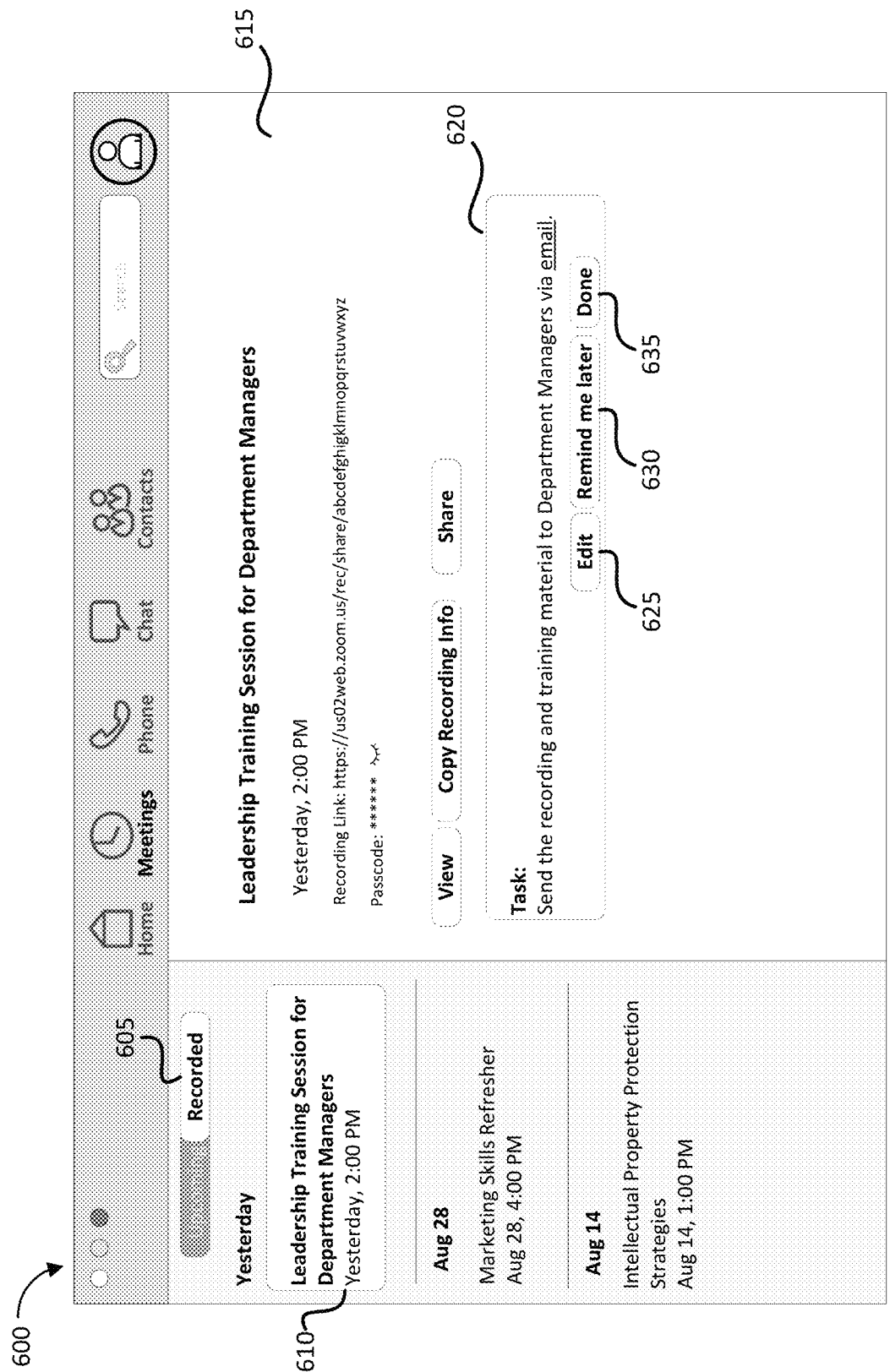
FIG. 6 shows an example GUI displaying a task item associated with a video conference.

Now referring to FIG. 6, FIG. 6 shows an example GUI 600 displaying a task item associated with a video conference. The GUI 600 displays a list of recorded video conferences 605. A user selects the recorded video conference 610. Information about the recorded video conference 610 is displayed in the display window 615. The display window 615 also includes a task item in a task window 620. The task window 620 displays the content of the task item. The "email" is hyperlinked. If the user clicks "email," an email window (not shown) can be displayed for the user to edit the content of the email and send the email to the department managers. In some examples, the recording link can be automatically populated in the email window. The task window 620 also includes some interactive buttons. For example, the "edit" button 625 enables the user to edit the task item. The "reminder me later" button 630 can be activated to send reminders to the user later. The "done" button 635 can enables the user to mark the task item as completed.

Figure 7:
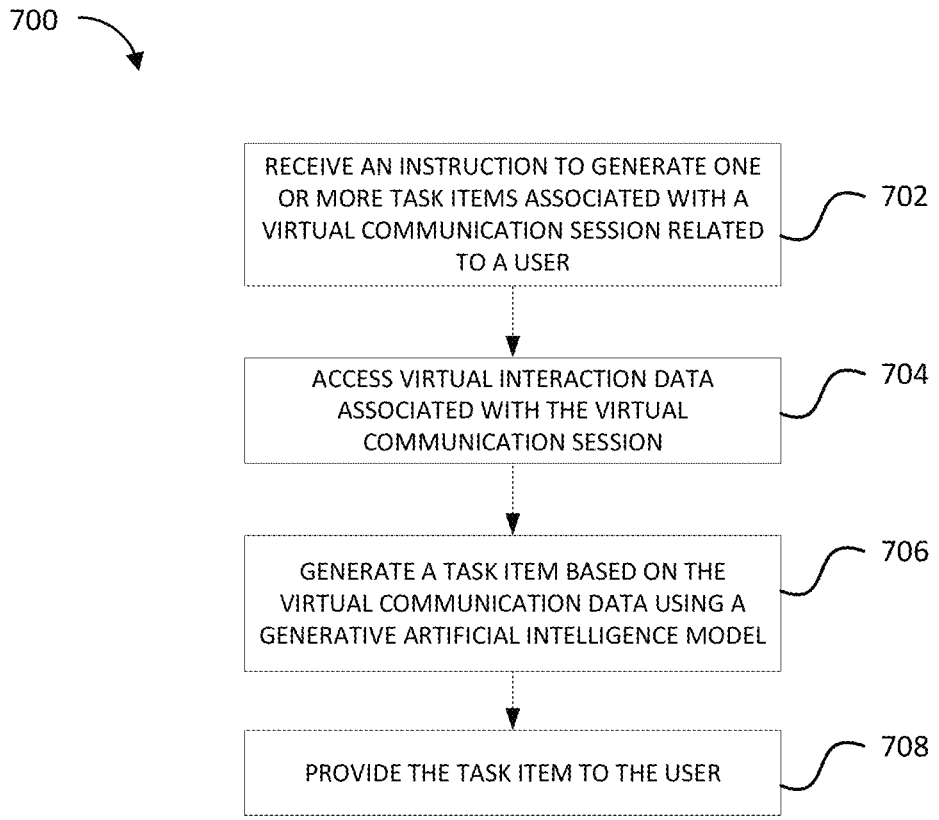
FIG. 7 shows an example method for automatic task generation.

Now referring to FIG. 7, FIG. 7 shows an example method 700 for automatic task generation. The example method 700 will be discussed with respect to the system 400 shown in FIG. 4; however, any suitable system for automatic task generation may be used.

At block 702, a communication platform 310 receives an instruction to generate one or more task items associated with a virtual communication session related to a user. The instruction can be pre-defined and updated by the user. The instruction can include one or more types of virtual communication sessions that can be processed for task generation and a task item structure. The one or more types of virtual communication sessions can include virtual conference, phone calls, or online chat sessions. The structure of a generated task item can include a suggested action, one or more action recipients, contact information associated with the one or more action recipients, and a summary of the virtual communication session.

At block 704, a communication platform 310 accesses virtual communication data associated with the virtual communication session. if the virtual communication session is a virtual conference, the virtual communication data associated with the virtual conference can include a recording of the virtual conference, a transcript for the virtual conference, or shared documents during the virtual conference. If virtual communication sessions is a phone call, the virtual communication data associated with the phone call includes a voicemail or a recording of the phone call. If the virtual communication session is an online chat session, the virtual communication data associated with the online chat session comprises one or more chat messages in the online chat session. The communication platform 310 can request a consent from the user for accessing and processing the virtual communication data or other personal data.

At block 706, the communication platform 310 generate a task item based on the virtual communication data using a generative artificial intelligence (AI) model. The task generation engine 420 on the communication platform 310 can generate one or more task items based on the virtual communication data using a generative AI model, as generally described in FIG. 4. For example, the task generation engine 420 can analyze the virtual communication data to identify actions needed to be taken by the user and extract contact information to create the task item following a task item structure specified in the instruction. The task generation engine 420 can aggregate task items generated from multiple virtual communication sessions related to the user into a list of task items.

At block 708, the communication platform 310 provides the task item to the user. The one or more task items can be displayed in a GUI of a communication application 440 associated with the user and provided by the communication platform 310. The task item can include hyperlinks. For example, a phone number is hyperlinked. If the user clicks the hyperlinked phone number, a call directed to the phone number is established. Also as an example, an email address is hyperlinked. If the user clicks the hyperlinked email address, an email page is opened, and certain fields, such as recipient, subject line, attachments, body of the email, can be automatically filled. In some examples, multiple task items from different types of communication channels can be aggregated and displayed in one tab or menu. In some examples, reminders about certain task items can be sent to the user.

The example process 700 illustrates a method for automatic task generation. However, not every step in the example process 700 may be needed, certain steps may have a different order, or some other steps may be added. The example process 700 is performed by a communication platform 310. Alternatively, the example process 700 can be performed by a communication application 440 installed on a client device 340.

Figure 8:
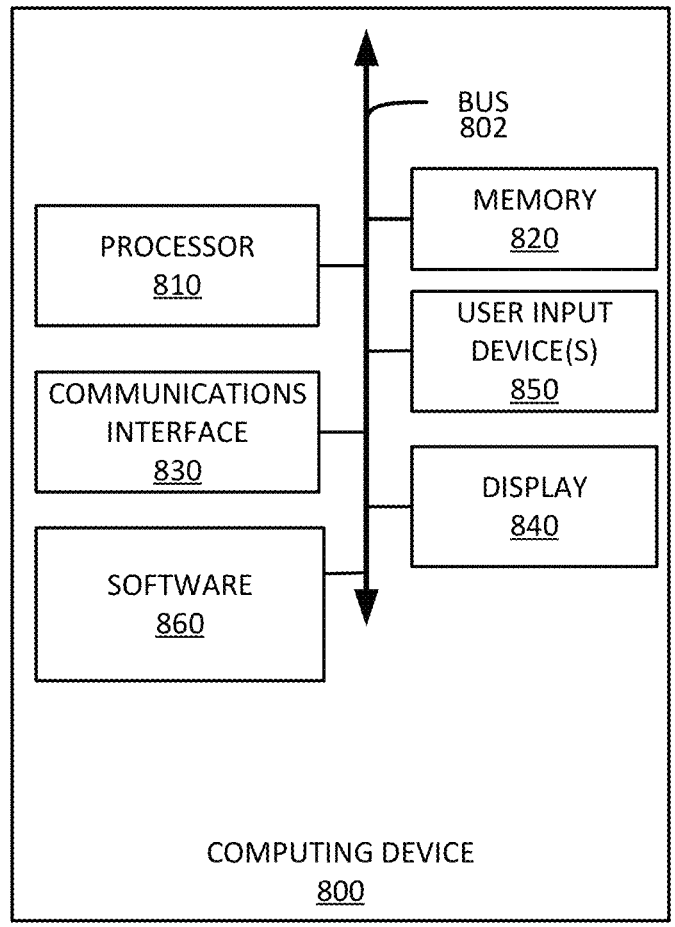
FIG. 8 shows an example computing device suitable for use in example systems or methods for automatic task generation, according to certain examples.

Now referring to FIG. 8, FIG. 8 shows an example computing device 800 suitable for use in example systems or methods for automatic task generation. The example computing device 800 includes a processor 810 which is in communication with the memory 820 and other components of the computing device 800 using one or more communications buses 802. The processor 810 is configured to execute processor-executable instructions stored in the memory 820 to perform one or more methods for automatic task generation, such as part or all of the example method 700, described above with respect to FIG. 7. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user. The computing device 800 may also include a software 860. The software 860 may include a communication application (client application), a communication platform, and any other software to enable communication from a first user to a second user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a client device associated with a user, an instruction for a generative artificial intelligence (AI) model to generate task items for the user from multiple types of virtual communication sessions related to the user;
accessing, by the client device associated with the user, virtual communication data associated with the multiple types of virtual communication sessions related to the user;
generating, using the generative AI model by the client device associated with the user, one or more task items for the user based on the instruction and the virtual communication data;
aggregating the one or more multiple task items for the multiple types of virtual communication sessions related to the user to obtain a list of task items; and
providing, by the client device associated with the user, the list of task items to the user.

2. The method of claim 1, wherein the updated instruction comprises the multiple types of virtual communication sessions that can be processed for task generation and a task item structure.

3. The method of claim 2, wherein the multiple types of virtual communication sessions comprise a virtual conference, and wherein the virtual communication data associated with the virtual conference comprises a recording of the virtual conference, a transcript for the virtual conference, or shared documents during the virtual conference.

4. The method of claim 2, wherein the multiple types of virtual communication sessions comprise a phone call, and wherein the virtual communication data associated with the phone call comprises a voicemail or a recording of the phone call.

5. The method of claim 2, wherein the multiple types of virtual communication session comprise an online chat session, wherein the virtual communication data associated with the online chat session comprises one or more chat messages in the online chat session.

6. The method of claim 2, wherein the task item structure comprises a suggested action, one or more action recipients, contact information associated with the one or more action recipients, and a summary of a virtual communication session.

7. The method of claim 1, further comprising transmitting a reminder message to the user to execute a task item.

8. The method of claim 1, wherein providing the list of task items to the user comprises causing the list of task item to be displayed in a graphical user interface (GUI), wherein the GUI comprises one or more interactive GUI elements corresponding to one or more task items of the list of task items.

9. The method of claim 1, further comprising updating a status of a task item based on a user action on the task item.

10. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
receive an instruction for a generative artificial intelligence (AI) model to generate task items for a user from multiple types of virtual communication sessions related to the user;
access virtual communication data associated with the multiple types of virtual communication sessions;
generate one or more task items for the user using the generative AI model based on the instruction and the virtual communication data;
aggregate the one or more task items for the multiple types of virtual communication sessions related to the user to obtain a list of task items; and
provide the list of task items to the user.

11. The system of claim 10, wherein the instruction comprises the multiple types of virtual communication sessions that can be processed for task generation and a task item structure, wherein the multiple types of virtual communication sessions comprise a virtual conference, a phone call, or an online chat session, and wherein the task item structure comprises a suggested action, one or more action recipients, contact information associated with the one or more action recipients, and a summary of a virtual communication session.

12. The system of claim 10, wherein providing the list of task item to the user comprises causing the list of task items to be displayed in a graphical user interface (GUI), wherein the GUI comprises one or more interactive GUI elements corresponding to one or more task items of the list of task items.

13. The system of claim 10, wherein the one or more processors are configured to execute further processor-executable instructions stored in the non-transitory computer-readable medium to:
transmit a reminder message to the user to execute a task item.

14. The system of claim 10, wherein the one or more processors are configured to execute further processor-executable instructions stored in the non-transitory computer-readable medium to:
update a status of a task item based on a user action on the task item.

15. A non-transitory computer-readable medium comprising processor-executable instructions configured to cause one or more processors to:
receive an instruction for a generative artificial intelligence (AI) model to generate task items for a user from multiple types of virtual communication sessions related to the user;
access virtual communication data associated with the multiple types of virtual communication sessions;
generate one or more task items for the user using the generative AI model based on the instruction and the virtual communication data;
aggregate the one or more task items for the multiple types of virtual communication sessions related to the user to obtain a list of task items; and
provide the list of task items to the user.

16. The non-transitory computer-readable medium of claim 15, wherein providing the list of task items to the user comprises causing the list of task items to be displayed in a graphical user interface (GUI), wherein the GUI comprises one or more interactive GUI elements corresponding to one or more task items of the list of task items.

17. The non-transitory computer-readable medium of claim 15, further comprising processor-executable instructions configured to cause one or more processors to:
transmit a reminder message to the user to execute a task item; and
update a status of the task item based on a user action on the task item.

* * * * *